(No Model.)

J. J. HICKS.
THERMOMETER.

No. 498,651.　　　　　　　　　　　Patented May 30, 1893.

Attest:
Walter E. Allen.
Edward P. Knight.

Inventor:
James Joseph Hicks.
By Knight Bro.
Attorneys.

THE NORRIS PETERS CO., PHOTO-LITHO., WASHINGTON, D. C.

UNITED STATES PATENT OFFICE.

JAMES J. HICKS, OF LONDON, ENGLAND.

THERMOMETER.

SPECIFICATION forming part of Letters Patent No. 498,651, dated May 30, 1893.

Application filed January 14, 1893. Serial No. 458,381. (No model.)

*To all whom it may concern:*

Be it known that I, JAMES JOSEPH HICKS, a subject of the Queen of Great Britain, residing at 8 Hatton Garden, London, in the county of Middlesex, England, have invented certain new and useful Improvements in Thermometers, of which the following is a specification.

The invention has for its object improvements in thermometers by the provision of improved means for recording the readings and thereby enabling them to be compared from time to time with each other, or the mean or extremes of temperature of one day to be compared with those of another.

It has been proposed to combine with a thermometer one or two sealed indicator tubes filled with a suitable liquid and provided each with a movable indicator and with a scale corresponding with those of the thermometer tube. Thermometers have also been provided with movable indicators clipping the tubes and capable of being slid up and down thereon to record the temperature; and they have also been provided with a movable indicator consisting of a sliding pointer mounted on a rod or on or in a guide or guides of other character formed on or fixed to the thermometer frame. According to my invention I avoid all these additional extraneous indicating means, and combine additional indicators and additional scales with the thermometer tube or tubes themselves.

Figure 1:
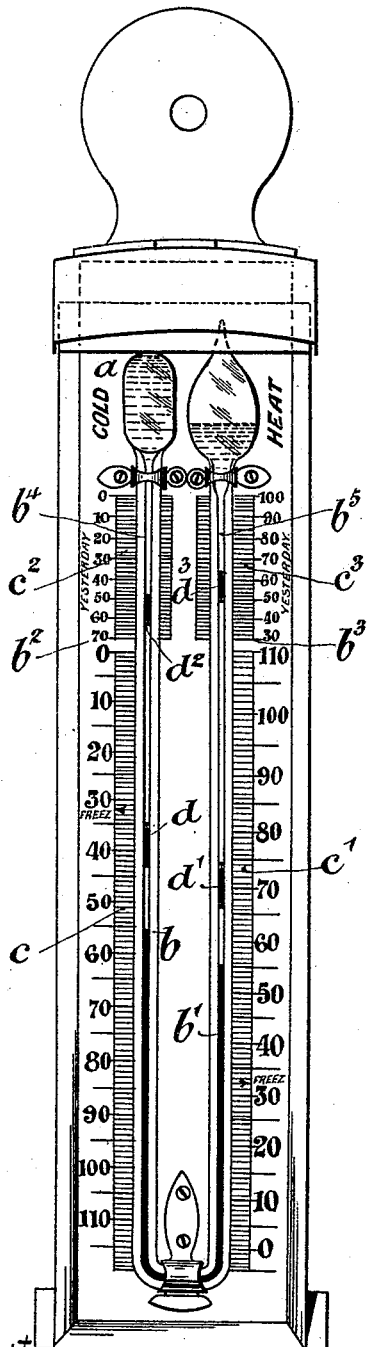
Figure 2:
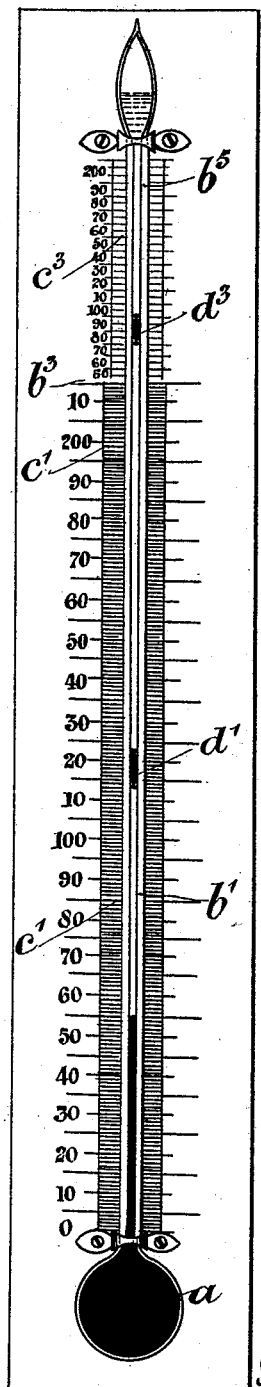

In the accompanying drawings I have represented at Figure 1, my invention applied to a self-registering maximum and minimum thermometer of the character known as a "Six's" thermometer, and at Fig. 2 I have represented my invention applied to a simple self-registering maximum thermometer.

In carrying my invention into effect I so arrange the dimensions of the bulb and of the ordinary tube or tubes of the thermometer, that the ordinary divisions or scale shall commence at or extend to such a position as will leave a sufficient length of tube or tubes to contain an additional indicator or indicators and to be used with compressed divisions or scales corresponding with those of the ordinary thermometer, thus combining with each thermometer tube a double set of scales and indicators.

In Fig. 1 $a$ represents the bulb, which is filled with expansible fluid, and $b\ b'$ the minimum and maximum tubes respectively; the ordinary divisions of the minimum scale $c$ commence at the point marked $b^2$, and those of the maximum scale $c'$ terminate at the point marked $b^3$, thus leaving a length of tubing $b^4$ or $b^5$ above each of such points, which is provided with a supplemental indicator $d^2$ or $d^3$ to be used in connection with the compressed scales $c^2\ c^3$; $d\ d'$ are the indicators ordinarily used with those parts of the thermometer tubes marked $b\ b'$.

In Fig. 2 $a$ is the bulb of the thermometer, $b'$ is the ordinary thermometer tube, $c'$ is the ordinary scale, and $d'$ is the ordinary indicator. Above the ordinary scale $c'$, commencing at the point marked $b^3$, the tube $b'$ is continued so as to provide a length of tubing $b^5$, which is supplied with an internal supplemental indicator $d^3$ to be used in connection with the compressed scale $c^3$.

The ordinary indicator $d$ or $d'$, that is to say, that which is acted upon by the mercury or other fluid, is carried, as usual, by such fluid to the maximum or minimum temperature, and the additional indicator $d^2$ or $d^3$ of each tube is moved by means of a magnet to the division on the compressed scale $c^2$ or $c^3$ corresponding with that of the thermometer tube, thus retaining a record for future comparison.

My invention is also applicable to separate minimum thermometers.

Having fully described my invention, what I desire to claim and secure by Letters Patent is—

1. A thermometer having a tube formed with an extension, a scale in connection with said extension, and an indicator in connection with said extension and said scale; substantially as described.

2. In thermometers, the combination with an extended portion of the ordinary tube, of a supplemental recording indicator within such extended portion and a supplemental compressed scale to be used in connection with such supplemental indicator, substantially as herein shown and described and for the purpose stated.

3. A thermometer having, in addition to the ordinary bulb, tube, scale and indicator, an extended portion of tube, a recording indicator within such extension and a compressed scale to be used therewith, substantially as herein shown and described and for the purpose stated.

JAS. J. HICKS.

Witnesses:
B. J. B. MILLS,
CLAUDE K. MILLS,
*Patent Agents, 23 Southampton Buildings, London.*